United States Patent [19]
Ogawa et al.

[11] Patent Number: 6,037,990
[45] Date of Patent: Mar. 14, 2000

[54] VIDEO SIGNAL PROCESSOR FOR GENERATING A PROGRESSIVE SCANNING FORMAT SIGNAL

[75] Inventors: Yoshihiko Ogawa, Kanagawa-ken; Hisakatsu Ito, Iwate-ken, both of Japan

[73] Assignee: Kabushiki Kaisha Toshiba, Kawasaki, Japan

[21] Appl. No.: 09/083,104

[22] Filed: May 22, 1998

[30] Foreign Application Priority Data

May 23, 1997 [JP] Japan .................................. 9-133823

[51] Int. Cl.⁷ .................................................. H04N 7/01
[52] U.S. Cl. .......................... 348/452; 348/604; 348/448
[58] Field of Search .................................. 348/452, 448, 348/450, 604, 558, 459, 458

[56] References Cited

U.S. PATENT DOCUMENTS

| | | | |
|---|---|---|---|
| 4,876,596 | 10/1989 | Faroudja ................................. | 348/450 |
| 5,022,201 | 6/1991 | Bernard ................................. | 348/452 |
| 5,249,037 | 9/1993 | Sugiyama et al. ..................... | 348/452 |
| 5,365,273 | 11/1994 | Correa et al. .......................... | 348/452 |
| 5,410,356 | 4/1995 | Kikuchi et al. ........................ | 348/452 |
| 5,606,373 | 2/1997 | Popp et al. ............................ | 348/558 |
| 5,689,301 | 11/1997 | Christopher et al. .................. | 348/97 |
| 5,825,429 | 10/1998 | Shirahata .............................. | 348/452 |
| 5,852,473 | 12/1998 | Horne et al. .......................... | 348/558 |
| 5,864,368 | 1/1999 | Kato et al. ............................ | 348/558 |
| 5,892,550 | 4/1999 | Iwasaki et al. ........................ | 348/452 |

FOREIGN PATENT DOCUMENTS 5-183884  7/1993  Japan .

*Primary Examiner*—Victor R. Kostak
*Attorney, Agent, or Firm*—Pillsbury Madison & Sutro Intellectual Property Group

[57] ABSTRACT

A video signal processor for preventing image damage resulting from when a first signal and a second signal are converted into each other. When a first signal (an interlaced scanning format signal) is inputted, according to a mode discriminating signal from a mode discriminator, a mixer/selector receives the motion detecting signal from the mode discriminator, adaptively mixes both outputs of a delay circuit and a line interpolating filter (IPF) and uses the combined outputs as an interpolation signal. When a second signal (a progressive scanning format signal converted to an interlaced scanning format signal) is inputted, the mixer/selector selects either the output of the second signal or the output of a delay circuit according to the mode discriminating signal and the field indexes from the mode discriminator and makes it as an interpolation signal. When an input signal is converted from a first signal to a second signal, the mixer/selector receives the motion detecting signal from the mode discriminator and selects the output from the line interpolating filter as an interpolation signal (intra-field interpolation) for at least one field of the changed-over signal according to the mode discriminating signal from the mode discriminator.

6 Claims, 4 Drawing Sheets

VIDEO SIGNAL PROCESSOR FOR GENERATING A PROGRESSIVE SCANNING FORMAT SIGNAL

FIELD OF THE INVENTION

The present invention relates to a video signal processor which generates a progressive scanning format signal from a first input signal, which is an interlaced scanning format signal, or a second input signal, which is an interlaced signal converted from a progressive scanning format signal.

BACKGROUND OF THE INVENTION

It is well known that film pictures, such as movies, for example, are signals having a 24 Hz frame frequency, while the NTSC system, which is widely adopted in e.g., Japan and the U.S.A., employs interlaced scanning format signals with a 30 Hz frame frequency.

In general, broadcast stations convert the film pictures from a progressive scanning signal format with a frame frequency of 24 Hz to an interlaced scanning signal format with a frame frequency of the 30 Hz, by performing a 3:2 pull-down conversion process before broadcasting the film pictures.

At the receiving side, the received signals are displayed by processing in similar ways as the conventional NTSC system TV signals or by processing a frame frequency conversion as disclosed in the Japanese Patent Application; Tokkai-Hei 7-95441.

In recent years, large-sized screen projection TV sets using LCD technology have been placed in the market with display units generally employing progressive scanning formats. Further, because of the appearance of large-sized screens, there is a demand for higher quality reproduced images.

For instance, when NTSC TV signals (i.e., interlaced scanning format signals with 30 Hz frame frequency) are inputted, it becomes possible to achieve the higher quality display by generating and displaying the progressive scanning format signals using the progressive scanning conversion method disclosed in the Japanese Patent Application; Tokkai-Hei 4-157886.

On the other hand, in DVD systems, which have recently come into the market, film pictures are recorded on DVD discs at the 24 Hz frame frequency. The recorded signals, however, are reproduced by DVD players as a 3:2 pull-down converted 30 Hz interlaced scanning format signals.

When displaying signals on a display unit using LCD technology, it is possible to obtain high quality reproduced images using the frame frequency conversion technique disclosed in the Japanese Patent Application; Tokkai-Hei 7-95441 as described above.

However, the reproduced images are not always the images of frame signals having a 24 Hz frequency and the signals may be contaminated with NTSC system TV signals. Although image memory is indispensable for the progressive scanning and conversion processes of these signals, the cost of the occupied image memory is high. Therefore, it is desirable to share the memory among a plurality of applications.

In such cases, when the input signal to be stored in memory has been transposed from the frame frequency 24 Hz video signals to the NTSC system TV signals (i.e., interlaced scanning format signal with 30 HZ frame frequency), the reproduced images may be disturbed. Therefore, the output of the memory has been conventionally masked for a prescribed period in order to conceal the disturbances of the reproduced images.

SUMMARY OF THE INVENTION

It is, therefore, an object of the present invention to provide a video signal processor capable of preventing the disturbance of images when the input signal has been transposed without requiring the increase of memory.

In order to achieve the above object, a video signal processor, wherein a first signal being an interlaced scanning format signal or a second signal being converted from progressive scanning format signal is inputted, the video signal processor contains a signal discriminating means for discriminating whether an input signal is the first signal or the second signal. The video signal processor also contains first means for generating an intra-field interpolation signal from the input signal; second means for generating an inter-field interpolation signal from the input signal; third means for delaying the output from the second means by one field; and motion detecting means for detecting the motion of an image from the input signal and the third means. The video signal processor further contains fourth means, wherein in response to the signal discriminating means determining that the input signal is the first signal, the fourth means generates an interpolation signal by adaptively mixing both outputs from the first and the second means in accordance with the motion detecting signal from the motion detecting means. Moreover, in response to the signal discriminating means determining that the input signal is the second signal, the fourth means selectively outputs the second signal as a direct output interpolations signal or the output of the third means as a delayed output interpolation signal.

Additional objects and advantages of the present invention will be apparent to persons skilled in the art from a study of the following description and the accompanying drawings, which are hereby incorporated in and constitute a part of this Specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
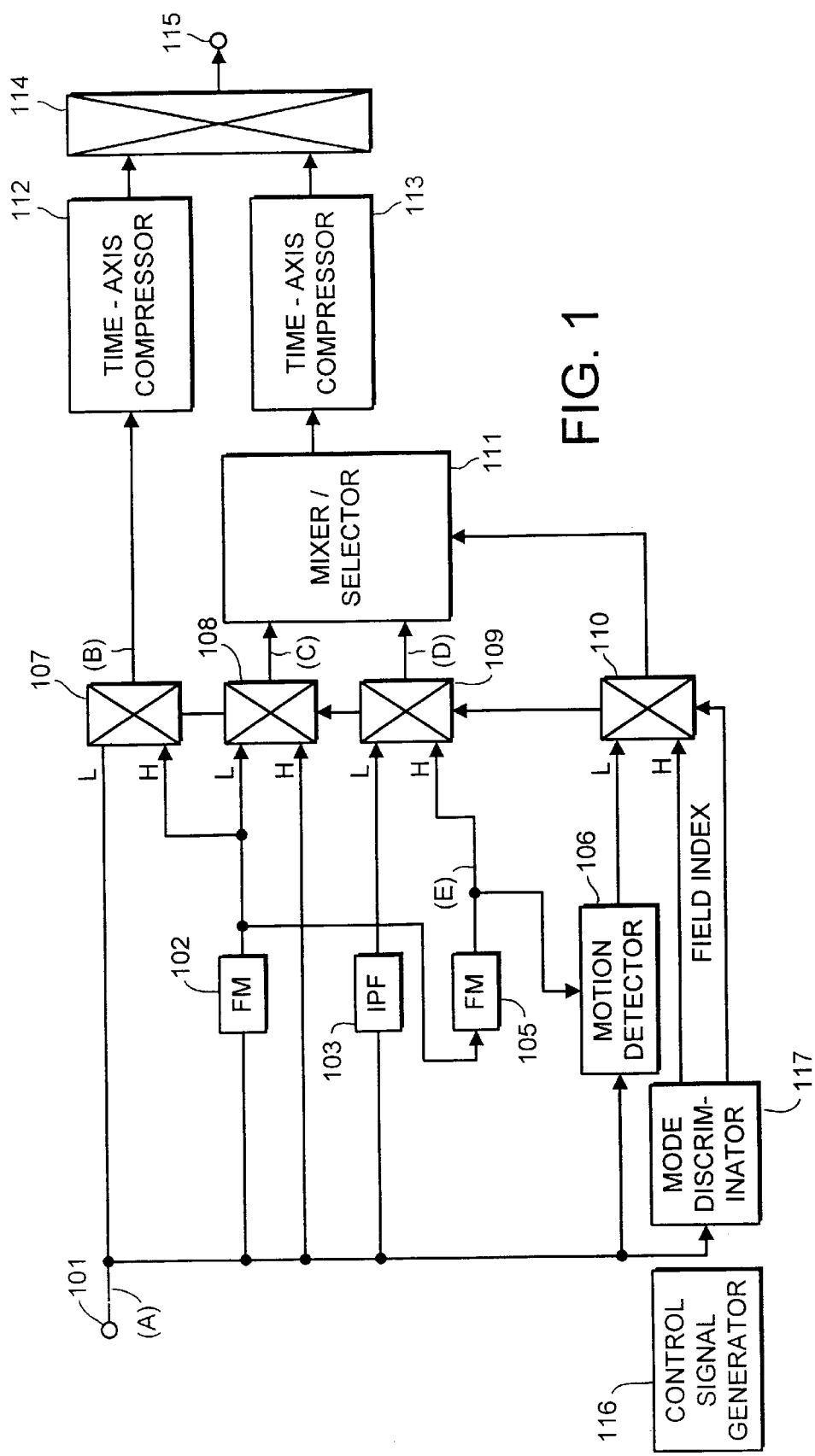
FIG. 1 is a block diagram illustrating the construction of an embodiment of the video signal processor of the present invention.

FIG. 1 illustrates the construction of an embodiment of the image signal processor of the present invention.

Figure 3:
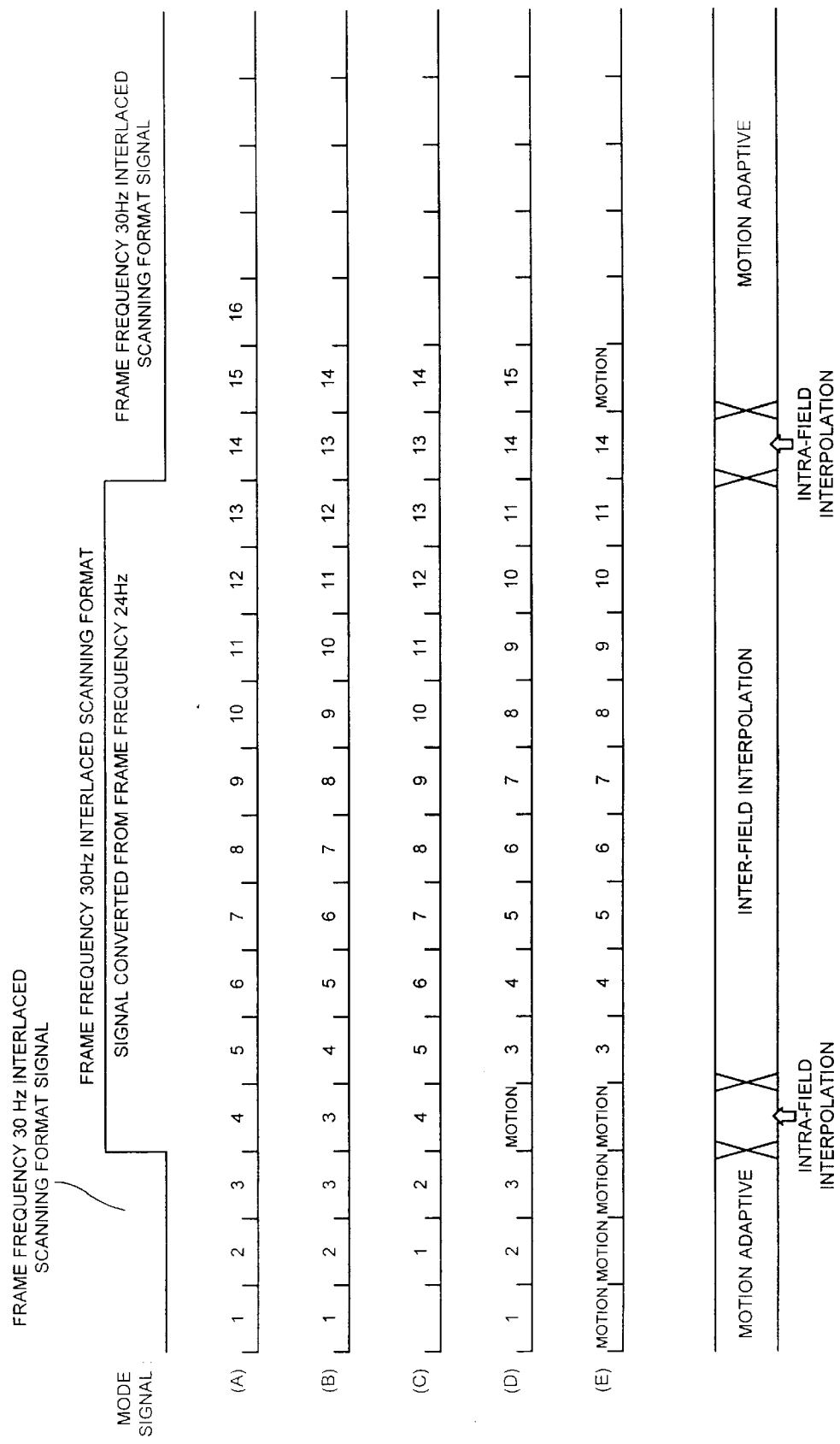
FIG. 3 is a timing diagram for explaining the operation illustrated in FIG. 1 when interlaced scanning format signal of frame frequency 30 Hz and interlaced scanning format signal of frame frequency 30 Hz converted from progressive scanning format signal of frame frequency 24 Hz are successively input in time sequence.

FIG. 3 is a diagram illustrating the timing relation among an input signal (A) to an input terminal 101, outputs (B)–(D) from selectors 107–109, and the output (E) of a field memory (FM) or a delay circuit 105.

As illustrated in FIG. 1, the mode discriminating signal indicates the mode discriminated from the input signals in a mode discriminator 117. In addition, L indicates the interlaced scanning format signal at the 30 Hz frame frequency and H indicates the 30 Hz interlaced scanning format signal converted from a signal with a 24 Hz frame frequency.

Furthermore, as depicted in FIG. 1, (A) is the input signal to be inputted to input terminal 101, (B) is the output of the selector 107, (C) is the output of the selector 108, (D) is the output of the selector 109 and (E) is the output of the delay circuit 105.

The operation for a regular signal, such as the luminance signal of the NTSC system TV signal, will be described as follows. As shown in FIG. 1, the regular signal is inputted to the input terminal 101 the selector 107, the delay circuit (FM) 102, the line interpolating filter (IPF) 103, the motion detector 106, and the mode discriminator 117. In the delay circuit 102, the delay process of delaying by one field (i.e., the inter-field interpolation process) is performed for the input signal which is then outputted to the selector 108 and the delay circuit (FM) 105.

In the line interpolating filter 103, the line interpolation signal (i.e., the intra-field interpolation signal) is generated and outputted to the selector 109. In the motion detector 106, using the signal (A) obtained from the input terminal 101 and the signal (E) obtained from the delay circuit 105, the motion of images are detected and the motion detected signal is outputted. This motion-detected signal is then inputted to the selector 110.

All of the selectors 107–110 are turned to the L terminals when the NTSC system TV broadcast signal has been inputted. In other words, the signal which is inputted through the input terminal 101 is outputted from the selector 107; the signal which has been delayed in the delay circuit 102 is outputted from the selector 108; and the interpolation signal which has been generated through the line interpolating filter 103 is outputted from the selector 109. Further, the motion detecting signal which was outputted from the motion detector 106 is outputted from the selector 110. The selector controls are executed by the mode discrimination signal obtained from the input signals in the mode discriminator 117.

In a mixer/selector 111, video signals inputted via the selectors 108, 109 are adaptively combined, based on the motion detecting signal inputted via the selector 110. That is, when the motion components are high, the ratio of the video signal inputted through the selector 108 is increased. Conversely, when the motion components are low, the ratio of the signals inputted through the selector 109 is increased.

The output of the mixer/selector 111 is inputted to a time-axis compressor 113 and the output of the selector 107 is inputted to a time-axis compressor 112. In circuits 112, 113, signals are outputted after being converted to a speed that is two times that of the inputted signals and are then inputted to a selector 114. In the selector 114, the signals from the time-axis compressors 112, 113 are switched alternately for every horizontal period by the control signal output from the control signal generator 116.

The output of the selector 114 is outputted from the output terminal 115 as the progressive scanning format signal. Thus, as indicated above, when NTSC system TV signals are inputted, the progressive scanning conversion process is carried out according to the motion of images.

Next, the operation of when film source signals (24 Hz frame frequency) are matched to the NTSC frame frequency signal by processing the 3:2 pull-down conversion, will be described using FIG. 1. In addition, the operating principle of the progressive scanning conversion will be described using FIG. 2.

Figure 2:
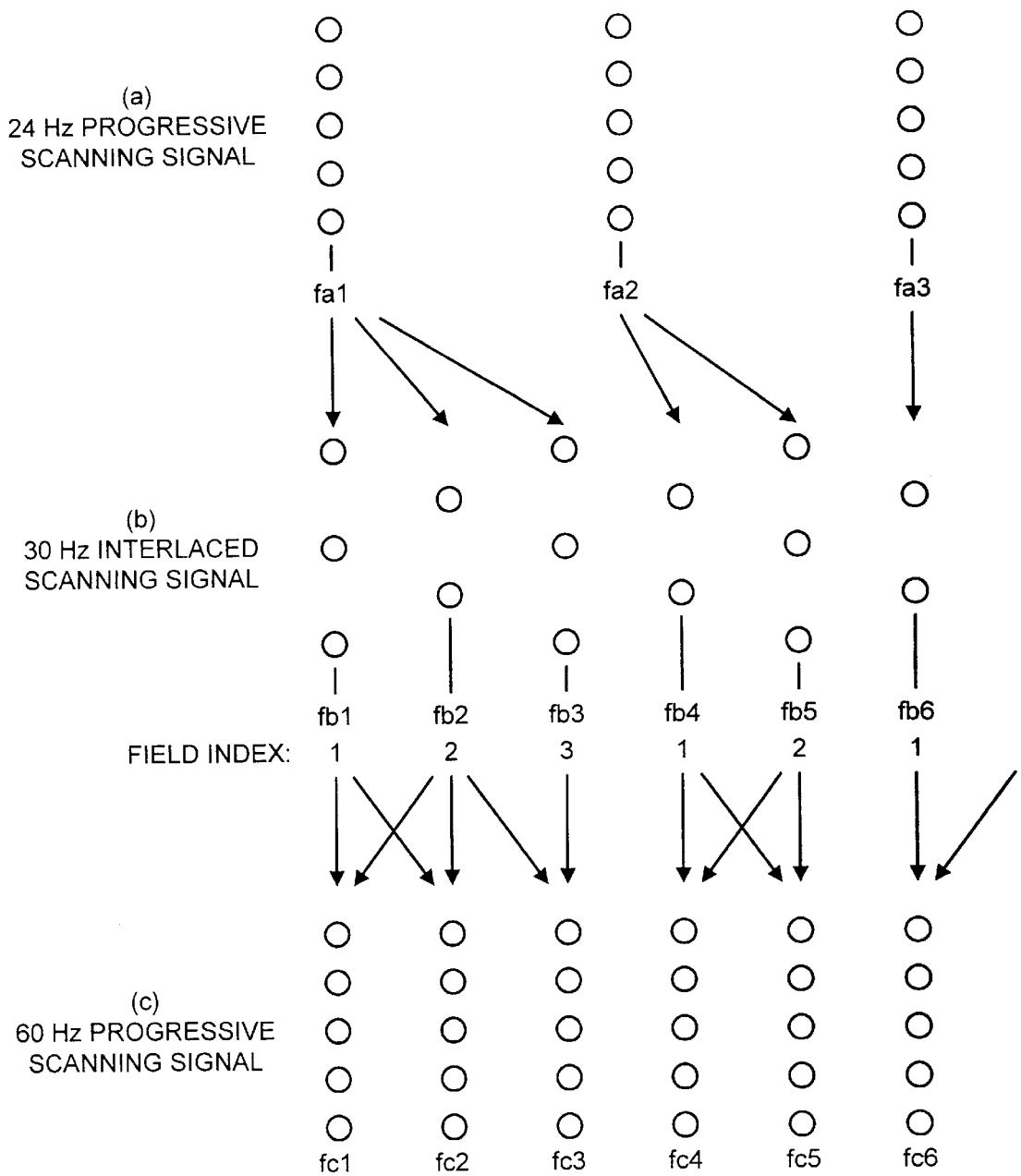
FIG. 2 is a diagram illustrating the operating principle of the progressive scanning conversion when a film picture (frame frequency 24 Hz) was processed via a 3:2 pull-down conversion and produced a signal which was agreed with frame frequency of NTSC signal.

In FIG. 2, (a), (b) illustrate the state of converting the progressive scanning format signal of frame frequency 24 Hz into the interlaced signal of frame frequency 30 Hz. A five field interlaced scanning format signal is produced from the original 2-framed progressive scanning format signal.

In general, for N frames (N is an integer), three of the signal fields are produced from one field signal. For N+1 frames, two field signals are produced from one field signal and the interlaced scanning format signal of the 30 Hz frame frequency, such as the NTSC system TV signal, is generated.

In case of a video reproduction apparatus, such as DVD reproduction device, data are recorded on a recording medium using 24 Hz progressive scanning format signals and when reproducing them, the data may be outputted after converting into the NTSC system TV signal. In such a case, it becomes possible to obtain a higher quality reproduced image using the progressive scanning conversion by the field superposition rather than the progressive scanning conversion according to the general motion adaptation.

When explaining using FIG. 2, the frame fc1 shown in FIG. 2(c) is generated using the field fb1 and the field fb2 shown in FIG. 2(b). The frame fc2 shown in FIG. 2(c) is generated using the field fb1 and the field fb2 shown in FIG. 2(b) (or using the field fb2 and the field fb3). The frame fc3 shown in FIG. 2(c) is generated using the field fb2 and the field fb3 shown in FIG. 2(b). The frame fc4 shown in FIG. 2(C) is generated using the field fb4 and the field fb5 shown in FIG. (2(b). The frame fc5 shown in FIG. 2(c) is generated using the field fb4 and he field fb5 shown in FIG. 2(b).

Thus, it becomes possible to obtain higher quality progressive scanned video using signals preceding or succeeding the current field by one field as interpolation signals through the progressive scanning conversion.

Then, the operation of progressive scanning process described above will be explained using FIG. 1 and FIG. 2.

The signals inputted to the input terminal 101 are then inputted to the delay circuit 102, the selector 108 and the mode discriminator 117. In the mode discriminator 117, the input signal is discriminated and the mode discrimination signal is generated. This mode discrimination signal controls the selectors 107, 108, 109 and 110. The mode discriminator 117 also generates field indexes of the input signal. These field indexes are assigned in order of generation from the original frame signal (FIG. 2(a)), for instance, 1 for the field fb1 in FIG. 2(b), 2 for the field fb2, 3 for the field fb3, 1 for the field fb4, 2 for the field fb5. These field indexes are transmitted to the mixer/selector 111 via the selector 110.

In the delay circuit 102, the input signal is delayed by one field period and transmitted to the selector 107 and at the same time, to the delay circuit 105. In the delay circuit 105, the input signal is further delayed by one field period and transmitted to the selector 109.

The selectors 108 and 109 are changed over in accordance with the mode discrimination signal from the mode discriminator 117, the input signal from the input terminal 101, and the input signal from the delay circuit 105, respectively inputted into the mixer/selector 111.

In the mixer/selector 111, according to the field indexes outputted from the mode discriminator 117, the outputs of the selectors 108 and 109 are converted. The output of the mixer/selector 111 is time-axis compressed in the time-axis compressor 113 and inputted to the selector 114.

The output from the selector 107 becomes the output of the delay circuit 102 by the mode discrimination signal from the mode discriminator 117, which is then inputted to the time-axis compressor 112 wherein it is time-axis compressed and input to the selector 114.

In the selector 114, the outputs of the time-axis compressors 112 and 113 are alternately changed over every one horizontal period by the control signal which is output from the control signal generator 116. The output of the selector 114 is outputted from the output terminal 115 as the progressive scanning converted signal.

As described above, only by changing the circuit operation, can the progressive scanning and conversion of both the originally interlaced scanning format signal (with the 30 Hz frame frequency) and the interlaced scanning format signal (with the 30 Hz frame frequency) converted from the progressive scanning format signal (with the 24 Hz frame frequency0 become possible. Furthermore, for the latter case, it is possible to generate a progressive scanned image with a higher quality.

As the two kinds of images described above are successively inputted, disturbance may be produced on the video depending on the signals stored in the delay circuit 105 as the images are transposed. Therefore, at a proper time after the input signal has been transposed between the different types of image signals, it is necessary to differentiate the output of the selector 110 for the progressive scanning conversion from that in the steady state.

When the two kinds of operation are executed as described above, different signals are outputted from the selectors and delay circuits as illustrated in FIG. 3. For example, when the 30 Hz interlaced scanning format signal is inputted to the input terminal 101, signals stored for the motion detection are outputted (E) from the delay circuit 105 as illustrated in FIG. 3.

On the other hand, when the 30 Hz interlaced scanning format signals, converted from the 24 Hz progressive scanning format signals are inputted to the input terminal 101, the signals inputted to the input terminal 101 and delayed by two fields are outputted from the delay circuit 105. These signals may damage images by the progressive scanning conversion at the time when the input signal has been transposed.

In this embodiment, the mode discriminator 117 detects the time that the input signal has been transposed and controls the output of the line interpolation filter 103 so that it is outputted from the mixer/selector 111 for the period of one field after the input signal has been transposed.

As such, the mode discriminator 117 outputs L for the period of one field after the input signal has transposed. As a result, the selector 109 selects the output of the line interpolating filter 103 and supplies it to the mixer/selector 111. Further, the selector 110 selects the motion detection signal from the motion detector 106 and supplies to the mixer/selector 111. The motion detection signal in this case becomes a control signal for selecting the output of the selector 109 by the mixer/selector 111. Thus, the intra-field interpolation is made and it becomes possible to avoid the damage of images.

Figure 4:
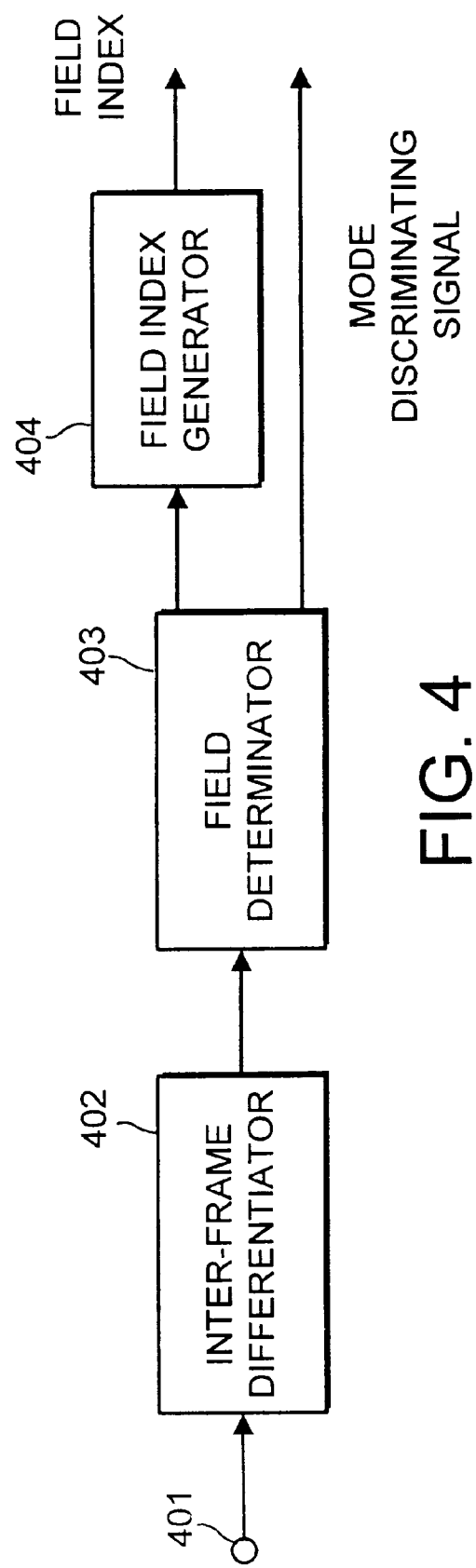
FIG. 4 is a block diagram illustrating one example of the construction of the mode discriminator illustrated in FIG. 1.

FIG. 4 illustrates one example of the mode discriminator 117. There are three cases to consider: the case where the interlaced scanning format signal of frame frequency 30 Hz was generated from progressive scanning format signal of frame frequency 24 Hz; the case of generating three field interlaced scanning format signal; and the two fields of interlaced scanning format signal from the progressive scanning one frame.

The field fb1 and the field fb3 illustrated in FIG. 4 become entirely the same signals and therefore, if a difference between these two fields is taken, the difference becomes zero. Shown in FIG. 4 is an example of the mode discriminator 117 utilizing this feature.

The signal input to the input terminal illustrated in FIG. 1 is given to the input terminal 401. An inter-field difference of this signal is taken by the inter-frame differentiator 402. This difference is determined in the field determinator 403 as to which fields of the fields fb1~fb5 shown in FIG. 2(b) this difference is equivalent to.

Based on this result of determination, field indices (1,2, 3,1,2,1,2,3,1, . . . ) are outputted from the field index generator 404. Further, the field determinator 403 determines whether the input signal is the interlaced scanning format signal of frame frequency 30 Hz converted from the progressive scanning format signal of frame frequency 24 Hz from the field difference. The field discriminator 403, then outputs the mode discrimination signal.

FIG. 4 illustrates one example of a circuit for determining the type of input signal from the signal which is inputted and it is needless to say that when a signal is applied from the outside, the process will become different.

Further, the construction of assigning the field indexes by the mode discriminator 117 when the 30 Hz interlace scanning format signal converted from the 24 Hz progressive scanning format signal, was described above in this embodiment. However, there will be no problem even when the system is so constructed that the field indexes are synchronized with the input signal and are separately inputted and the selectors 107~110 and the mixer/selector 111 are controlled according to the field indexes.

In addition, the case where the 30 Hz interlaced scanning format signal converted from the 24 Hz progressive scanning format signal was described above in this embodiment. However, even when the signal converted to a frame frequency of 50 Hz, for instance, the PAL signal is inputted, the same process is applicable at the time that images are changed over. Further, the delay amount of the delay circuits 102,105 are one field, respectively in this case.

Moreover, the frame frequency of the progressive scanning format film picture signal to be converted into the interlaced scanning format signal is not limited to 24 Hz.

Furthermore, the period that the output of the line interpolating filter 103 is selected by the mixer/selector 111 is not limited to one field period, but it can take two field periods or more. Further, it is also possible to construct the delay circuits 102 and 105 by a single-chip memory.

As described above, according to the present invention, even when the interlaced scanning format signal converted from the 24 Hz progressive scanning format signal and originally interlaced scanning format signal are successively inputted, no damage is produced by the image conversions. Accordingly, it becomes possible to reproduce the progressive scanning format signal with a higher image quality than before without increasing memory.

As described above, the present invention can provide an extremely preferable video signal processor.

While there have been illustrated and described what are the preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

What is claimed is:

1. A video signal processor comprising:

input means for receiving an input signal, said input signal being one of a first signal and a second signal, said first signal having an interlaced scanning format and said second signal being converted from a progressive scanning format;

signal discriminating means for determining whether said input signal comprises said first signal or said second signal;

intra-field generating means for generating an intra-field interpolation signal from said input signal;

inter-field generating means for generating an inter-field interpolation signal by one field;

delay means for delaying said inter-field interpolation signal from said input signal;

motion detecting means for detecting a motion of an image from said input signal and said delayed inter-field interpolation signal and for generating a motion detecting signal; and interpolation generating means for generating an interpolation signal, wherein, responsive to said signal discriminating means determining that said input signal comprises said first signal, said interpolation generating means generates said interpolation signal by adaptively mixing said intra-field interpolation signal and said inter-field interpolation signal in accordance with said motion detection signal, and wherein, responsive to said signal discriminating means determining that said input signal comprises said second signal, said interpolation generating means generates said interpolation signal by selectively outputting said second signal or by outputting said delayed inter-field interpolation signal.

2. The video signal processor of claim 1, further including, a memory for storing at least two fields of said input signal, wherein a first one of said two fields is used by said inter-field generating means for generating said inter-field interpolation signal and a second one of said two fields is used by said delay means for delaying said inter-field interpolation signal.

3. The video signal processor of claim 1, wherein when said input signal is transposed from said first signal to said second signal, said interpolation generating means generates said interpolation signal by outputting said intra-field interpolation signal for at least one field after said input signal has been transposed.

4. The video signal processor of claim 1, wherein when said input signal is transposed from said second signal to said first signal, said interpolation generating means generates said interpolation signal by outputting said intra-field interpolation signal for at least one field after said input signal has been transposed.

5. The video signal processor of claim 1, further including, identifying means for inputting an identifying signal that is synchronized with said input signal, wherein responsive to said identifying signal, said interpolation generating means generates said interpolation signal by selectively outputting said second signal or by outputting said delayed inter-field interpolation signal.

6. The video signal processor of claim 1, wherein said signal discriminating means generates an identifying signal from said input signal when said input signal comprises said second signal and the interpolation generating means generates said interpolation signal by selectively outputting said second signal or by outputting said delayed inter-field interpolation signal.

* * * * *